Nov. 9, 1954    W. H. WANNAMAKER, JR., ET AL    2,694,193
FOLLOW-UP TELEMETERING APPARATUS
Filed Feb. 1, 1951
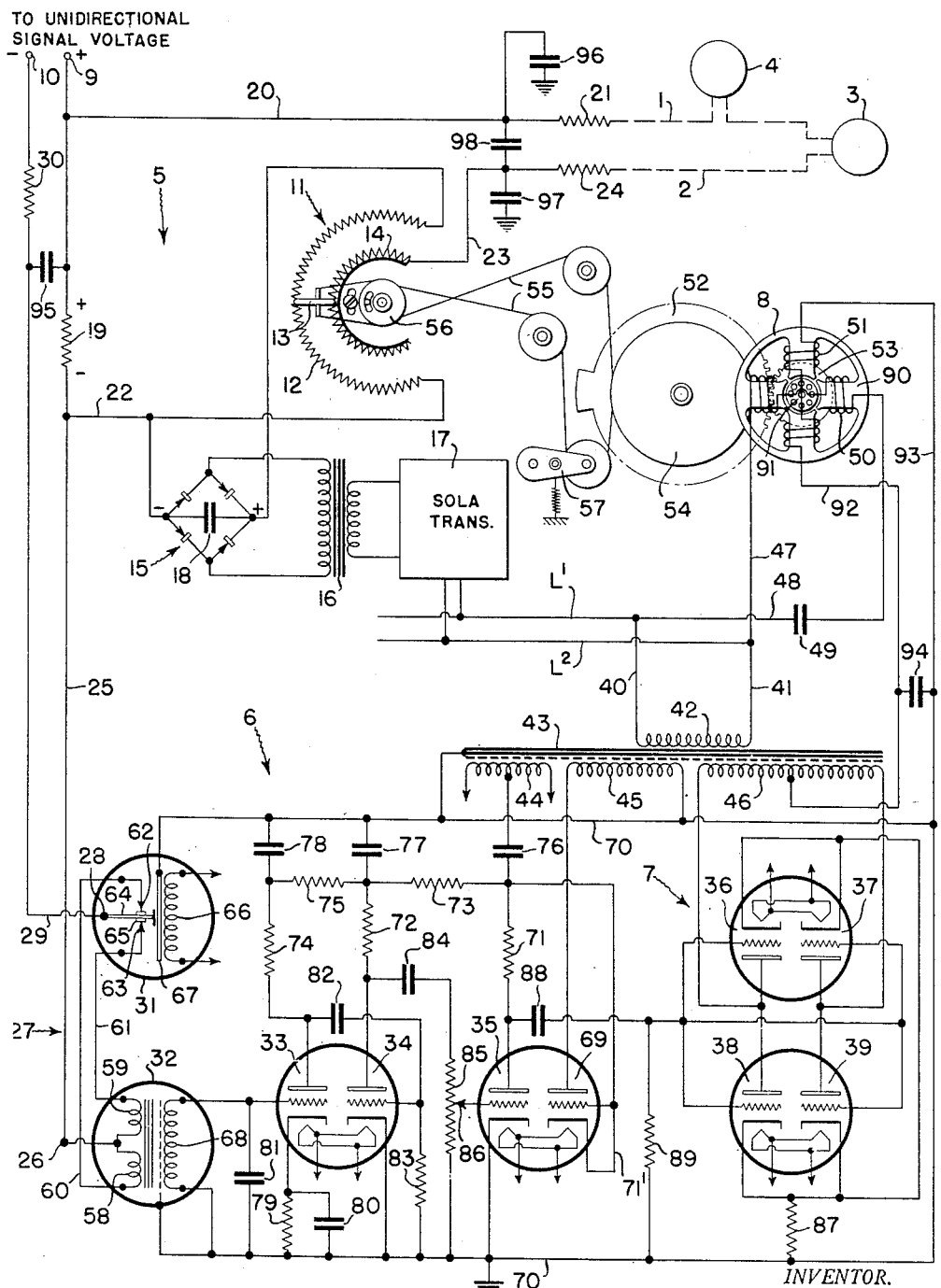
INVENTOR.
WILLIAM H. WANNAMAKER JR.
GUSTAVE EHRENBERG
BY
            ATTORNEY.

United States Patent Office 2,694,193
Patented Nov. 9, 1954

2,694,193

FOLLOW-UP TELEMETERING APPARATUS

William H. Wannamaker, Jr., and Gustave Ehrenberg, Philadelphia, Pa., assignors to Minneapolis-Honeywell Regulator Company, Minneapolis, Minn., a corporation of Delaware Application February 1, 1951, Serial No. 208,859

9 Claims. (Cl. 340—187)

The present invention relates to electric metering apparatus and in particular to remote metering apparatus providing continuous and substantially instantaneous readings of electrical, mechanical and other quantities at a distant point.

A general object of the invention is to improve remote metering apparatus of the type in which the transmitting and receiving devices are connected by a two-conductor transmission circuit.

Another object of the invention is to provide such improved metering apparatus which is characterized by its high sensitivity to changes in the quantity being measured and by its great accuracy in remotely exhibiting the magnitude and changes in the magnitude of the said quantity.

A further object of the invention is to provide such an improved remote metering apparatus which is operative to transmit correct measurements of the quantity to a distant point notwithstanding variations in the resistance of the transmission circuit, the voltage of the electrical current supply source, or the disturbing influence of extraneous electrical and/or magnetic fields to which the apparatus including the transmission circuit may be subjected. These ends are obtained by means of the present invention because the basic principle of operation of the apparatus is a true dynamic electrical balance of current whereby the apparatus inherently is self-correcting for such variations.

A specific object of the invention is to provide a highly sensitive and trouble-free transmitting device for such remote metering apparatus in which the electrical balance of current necessary to the accurate transmission of the quantity being measured is accomplished by so-called power-positioned means.

A more specific object of the invention is to provide such remote metering apparatus in which the transmitting device incorporates suitable electrical transformer means adapted for energization from a commercial source of alternating current to supply all of the necessary operating voltages.

Another specific object of the invention is to provide such remote metering apparatus in which the transmitting device includes simple and efficient means for reducing hunting to a minimum.

It is also an object of the invention to provide an improved remote metering apparatus which is operative to provide readings at a plurality of distant points and to which additional remotely located receiving devices may be added or from which receiving devices may be removed without in any way affecting the accuracy of the readings of the receiving devices retained.

In the improved remote metering apparatus of the present invention, there is employed in the transmitting device, a reversible rebalancing motor arrangement of the so-called conversion type disclosed in the Walter P. Wills Patent 2,423,540 granted July 8, 1947. That reversible rebalancing motor arrangement is cooperatively associated with a measuring circuit and with a two-conductor transmission circuit in a novel manner to establish in the transmission circuit a unidirectional electrical current flow. The magnitude of this unidirectional electrical current flow is determined solely by the magnitude of a unidirectional signal voltage, which is applied to the measuring circuit. The unidirectional signal voltage may itself comprise the quantity being measured and transmitted to a distant receiving device or it may be representative only of that quantity. In the latter case, the signal voltage may be derived in any well-known manner from the quantity being measured and which it is desired to transmit to a distance. As will become apparent as the description proceeds, the transmission circuit may be connected to one or more remotely located receiving devices for exhibiting at one or more distant points the magnitude and changes in the magnitudes of the quantity being measured and transmitted.

In accomplishing the transmission of the signal voltage to the distant point or points, the signal voltage is connected to the input terminals of the measuring circuit, in series opposition to a unidirectional voltage drop which is produced across a fixed resistor also connected in the measuring circuit. The unidirectional electrical current flow through this fixed resistor and which creates the said voltage drop is the same unidirectional current which flows in the two-conductor transmission circuit to the distant receiving device or devices. This unidirectonal current flow is derived from and its magnitude is determined by the adjustment of an adjustable voltage divider or potentiometer slidewire resistor. To this end, the said slidewire resistor is energized from a suitable source of unidirectional voltage. One end terminal of the slidewire resistor and the adjustable contact or wiper are connected in a series circuit with the fixed resistor and the two-conductor transmission circuit. For the purpose of accomplishing the automatic adjustment of the wiper along the slidewire resistor, the wiper is mechanically connected to the driving shaft of the reversible motor. The reversible electrical motor, in turn, is arranged to be selectively energized for rotation in one direction or the other whenever the unidirectional signal voltage and the voltage drop across the fixed resistor are unequal in magnitude.

To this end, the reversible rebalancing motor arrangement includes a conversion device for transforming the resultant of the opposed unidirectional signal voltage and the voltage drop across the fixed resistor into an alternating signal voltage of one phase or of the opposite phase depending upon the polarity of the resultant voltage. This alternating signal voltage is amplified by a voltage amplifier and a motor drive amplifier included in the reversible rebalancing motor arrangement. The output of the motor drive amplifier is applied to the reversible electrical motor, and in a manner explained in detail in the Wills patent selectively energizes the motor for rotation in a direction determined by the phase of the alternating signal voltage.

Thus, upon deviation from equality in the magnitudes of the signal voltage and the voltage drop across the fixed resistor, the reversible electric motor adjusts the wiper along the slidewire resistor to effect a change in the unidirectional current flow in the transmission circuit and through the fixed resistor. The magnitude of such change is that necessary to reduce to zero the resultant of the unidirectional signal voltage and that across the fixed resistor, which condition obtains when the unidirectional signal voltage and the unidirectional voltage drop are connected in opposition to each other and their magnitudes are equal. As those skilled in the art will understand, the attainment of this condition does not depend upon such variable and unpredictable factors as the resistance of the two-conductor transmission circuit or the voltage of the electrical current supply source, and it is not disturbed by extraneous electrical and magnetic fields to which the transmitting and receiving devices and the transmission circuit may be subjected. In this manner, the unidirectional current flowing in the two-conductor transmission circuit is made to accurately represent the magnitude of the quantity being measured and transmitted.

One form of receiving device which may be employed in the remote metering apparatus of the present invention is a unidirectional current meter calibrated in terms of the quantity measured. This receiving meter may be either of the indicating or recording type. Since the current flow in the transmission circuit is independent of the transmission circuit resistance, a plurality of receiving devices or meters may be connected in series in the transmission circuit to provide readings at a plurality of distant points. These meters may be located at points distant from each other and from the transmitter. They preferably are connected in series with each other in the transmisssion circuit to permit the removal or addition of meters without producing any effect on the accuracy of the readings of the meters retained in the transmission circuit.

For the purpose of minimizing the disturbing effects of extraneous electrical and magnetic fields to which the remote metering apparatus may be subjected, there is provided at the output terminals of the transmitting device a suitable filter comprising condensers and resistors. In a preferred arrangement, the condensers are of fixed value and are so connected as substantially to couple the two conductors of the transmission circuit to each other and to ground potential. The resistors are also of fixed value and cooperate with the condensers to provide the desired filtering action. In addition, however, the resistors serve the important function of minimizing any undesired effect which changes in the transmission circuit impedance tend to produce upon the accuracy of the distance reading or readings provided by the remote metering apparatus.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the single figure of the drawing, there is illustrated a transmitting device which is connected by a two-conductor transmission line indicated in dotted lines and designated by reference numerals 1 and 2 to distantly located receiving devices 3 and 4. The receiving devices 3 and 4 may be remotely located with respect to each other as well as to the transmitting device. While only two receiving devices have been shown in the drawing, it will be understood that additional receiving devices may be connected in the transmission circuit 1, 2, in series with the receiving devices 3 and 4, or if desired, only one such receiving device may be connected therein.

It is a feature of the remote metering apparatus provided in accordance with the present invention that additional receiving devices may be connected in the transmission circuit or one or more receiving devices may be removed without affecting in any significant way the accuracy of the readings of the receiving devices retained in the circuit.

The transmitting device includes a measuring circuit indicated generally at 5, an electronic voltage amplifier 6, a motor drive amplifier 7, and a reversible electrical motor 8. As shown, the measuring circuit 5 includes a pair of input terminals 9 and 10 to which a unidirectional signal voltage is applied. This unidirectional signal voltage may comprise the quantity it is desired to transmit accurately to the distant receiving devices 3 and 4, or it may merely be representative of such a quantity, in which case suitable means, not shown, would be provided for deriving the signal voltage from the measured quantity.

The measuring circuit also includes an adjustable slidewire resistor arrangement 11 comprising a slidewide resistor 12, an adjustable contact or wiper 13, and a conductor bar 14. A unidirectional voltage for energizing the slidewire resistor 12 is obtained, in the embodiment of the invention disclosed in the drawing, from a commercial source of alternating current supply indicated by the reference characters L′ and L². To that end, there is provided a small selenium bridge rectifier indicated generally at 15, a step-down transformer 16, and a constant voltage transformer 17 which may be of the well-known Sola type. As shown, the output terminals of the selenium bridge rectifier 15 are shunted by a voltage stabilizing condenser 18 and are connected to apply the output voltage thereof across the slidewire resistor 12. With this arrangement, a unidirectional voltage of substantially constant magnitude is maintained across the slidewire resistor, notwithstanding substantial changes in magnitude of the alternating voltage of the supply lines L′ and L². The magnitude of the unidirectional voltage so maintained across the slidewire resistor 12 in a practically operative form of the present invention, is 5 volts to provide variable current in the two-conductor transmission circuit 1, 2 in accordance with the unidirectional signal voltage applied to terminals 9 and 10 of the measuring circuit. It will be understood that the unidirectional voltage maintained across the slidewire resistor 12 may be larger or smaller in magnitude as desired and may be derived from suitable batteries as well as from the selenium rectifier and transformer arrangement illustrated. This selenium rectifier and transformer arrangement is advantageous however, in that it dispenses with the need for periodic replacement of batteries and the attendant service problems and difficulties.

As illustrated, the measuring circuit 5 includes a fixed resistor 19 through which there is passed the transmission circuit current established in accordance with the adjustment of the wiper 13 along the slidewire resistor 12. To this end, the upper end terminal of resistor 19 as is seen in the drawing is connected by a conductor 20 and a fixed resistor 21 to the transmission circuit conductor 1. The lower end terminal of resistor 19 is connected by a conductor 22 to the lower terminal of slidewire resistor 12 and the wiper 13 in engagement with the slidewire resistor is connected by the conducting bar 14, a conductor 23 and a fixed resistor 24 to the transmission conductor circuit 2. With this arrangement, therefore, a voltage drop is established across the fixed resistor 19 which is of the polarity indicated and the magnitude of which varies in accordance with the magnitude of the current flow in the transmission circuit conductors 1, 2.

As will be apparent, the fixed resistor 19 is common to both the measuring circuit 5 and the transmission circuit 1, 2. Thus, the voltage drop across the resistor 19 is connected in the measuring circuit 5 in opposition to the unidirectional signal voltage applied to the input terminals 9 and 10. Specifically, the upper and positive terminal of resistor 19 is connected to the terminal 9 and the lower and negative terminal of resistor 19 is connected by a conductor 25 to one input terminal 26 of a D. C. to A. C. converting mechanism indicated generally by the reference numeral 27. The other input terminal 28 of the device 27 is connected by a conductor 29 through a fixed resistor 30 to the input terminal 10. In the normal balanced condition of the measuring circuit 5, substantially no current flows through the conductors 25 and 29 to the converting device 27, but when the measuring circuit 5 is unbalanced by a change in the unidirectional signal voltage applied to the input terminals 9 and 10, a unidirectional current flows through the conductors 25 and 29 to the converting device 27 in a direction depending upon the direction of the change in magnitude of the unidirectional signal voltage. That current flows through the conductors 25 and 29 to the converting device 27 and is changed by means of the converting device 27 into an alternating current signal voltage which is amplified in the electronic amplifier 6.

As shown, the converting device 27 includes a vibrator 31 and a transformer 32. The construction and operation of the vibrator 31 and transformer 32 in transforming the unidirectional current flow through conductors 25 and 29 into an alternating current signal voltage of one phase or of opposite phase depending upon the direction of flow of that unidirectional current are fully described in the aforementioned Wills patent and therefore require no further explanation herein. The electronic voltage amplifier 6 is also described in the Wills patent and therefore requires no detailed explanation. Suffice it to say that the amplifier 6 comprises 3 electronic vacuum triode valves 33, 34, and 35. The associated motor drive amplifier 7 is a power amplifier including electronic valves 36, 37, 38, and 39. The amplified output voltage of the voltage amplifier 6 is applied to the input terminals of the motor drive amplifier 7. Thus, the motor drive amplifier 7 operates, when a unidirectional current flows through the measuring circuit conductors 25 and 29, to energize the motor 8 for operation in the direction and to the extent required to rebalance the measuring circuit 5.

The voltage amplifier 6, the motor drive amplifier 7, and the motor 8 are energized by alternating current supplied through conductors 40 and 41 from any available source of alternating current which may be of conventional voltage and frequency, for example, 115 volts and 60 cycles per second. This source of alternating current is shown to be the supply lines L′ and L² which are connected through the transformers 16 and 17 to the selenium rectifier 15 for creating the unidirectional slide-wire voltage. The conductors 40 and 41 connect the supply lines L′ and L² respectively to the opposite terminals of the primary winding 42 of a transformer 43 having a plurality of secondary windings 44, 45, and 46. The supply lines L¹ and L² are also connected by conductors 47 and 48 through a fixed condenser 49 to a power winding 50 on the motor 8.

The motor 8 includes a so-called control winding 51 to which energizing current is supplied by the motor drive amplifier 7, in a manner to be described hereinafter. The motor 8 is adapted to adjust the wiper 13 along the length of the slidewire resistor 12 through a drive connection including a gear 52, which has its gear teeth in mesh with the teeth of a gear 53 coaxial with and secured to the rotor of the motor 8. As said rotor rotates, the gear 52 rotates a cable drum 54 which is attached to and coaxial with the gear 52. The rotation of the drum 54 operates through a flexible connection 55, which may be a cable, to rotate a second cable drum 56. The flexible connection 55 is kept suitably taut by a tension device 57.

The drum 56 supports the slidewire contact or wiper 13 and oscillates it about the axis of the drum 56. While not so shown in the drawing, the slidewire resistor 12 may comprise a body portion in the form of a helix which has spaced-apart convolutions and is bent to form a circular arc coaxial with the drum 56. The sliding contact or wiper 13 serves as a bridging conductor between a point of the slidewire resistor 12 engaged by one end of the contact 13 and the collector bar 14 at a point engaged by the second end of the contact 13. The collector bar 14 comprises a helix having a spaced-apart convolution and is arranged coaxially with the drum 56. As shown, the spaced-apart convolutions of the collector bar 14 are directly connected to each other so that the resistance between contact 13 and conductor 23 remains substantially constant notwithstanding changes in the position of contact 13 along the conductor bar and slidewire resistor. A practically operative form which the drive connection to the contact 13 along the slidewire resistor 12 may take is disclosed in the aforementioned Wills patent and therefore no additional explanation herein is believed necessary.

The input terminal 9 of the measuring circuit 5 is connected by the fixed resistor 19 and conductor 25 to the connected ends of primary windings 58 and 59 of the transformer 32. The other ends of the windings 58 and 59 are connected by conductors 60 and 61 to relatively stationary contacts 62 and 63, respectively, of the vibrator 31. As schematically shown on the drawing, a tip portion of iron or analogous material adapted to serve as an armature is carried at the free end of a vibrating reed 64. A contact 65 mounted on the end of the reed 64 is interposed between the contacts 62 and 63, and preferably is in engagement with each of these contacts when the reed is in its central position shown in the drawing. As the reed moves away from its intermediate position in one direction, the contact 65 separates from the contact 62; and when the reed moves in the opposite direction away from its central position, the contact 65 separates from contact 63. The reed 64 is a flexible metallic spring conductor which connects the contact 65 through the conductor 29 and the fixed resistor 30 to the input terminal 10 of the measuring circuit 5.

The reed 64 is vibrated with the frequency, usually 60 cycles per second, of the alternating current supplied to the primary winding 42 of the transformer 43 by supply lines L' and L². To this end, the secondary winding 44 on the transformer 43 is connected to the terminals of a winding or coil 66 included in the vibrator 31. The coil 66 operates in conjunction with a permanent magnet 67 to polarize the reed 64 for vibration with the frequency of the current flow in the coil 66. The transformer 32 is provided with a secondary winding 68 in which the alternating current voltage signals amplified in the voltage amplifier device 6 are developed in a manner now to be described.

During the portion of each alternating current half cycle in which the vibrating contact 65 is out of engagement with the relatively stationary contact 62, current flows between the conductors 29 and 25 through a circuit which may be traced from conductor 29 to reed 64, contacts 65 and 63, conductor 61, and transformer primary winding 59 to conductor 25. During the portion of the following half cycle of alternation in which the contact 65 is out of engagement with the contact 63, current flows between the conductors 29 and 25 through reed 64, contacts 65 and 62, conductor 60, and transformer primary winding 58 to conductor 25. The transformer primary windings 58 and 59 and the secondary winding 68 are so relatively arranged that the unidirectional current pulses in the windings 58 and 59 induce an alternating current in the secondary winding 68. That current is in phase, or is 180° out of phase, with the current induced in the transformer secondary winding 44, accordingly as the current flow through the conductors 25 and 29 is in one direction or in the opposite direction. The magnitude of the current flow through the conductors 25 and 29 depends on the magnitude of the change in voltage of the unidirectional signal voltage applied to the input terminals 9 and 10, and the magnitude and the phase of the current induced in the transformer secondary winding 68 are thus selectively dependent on the magnitude and direction of the change in the said unidirectional signal voltage.

The direction of rotation of the motor 8, when energized, is dependent on the phase of the current induced in the transformer secondary winding 68, and is that required to adjust the wiper 13 in the direction to restore equality in magnitude between the unidirectional signal voltage and the voltage drop across the fixed resistor 19, which unidirectional signal voltage and voltage drop are connected in opposition to each other.

The voltage amplifier valves 33, 34, and 35, of the voltage amplifier 6 are triodes of the indirectly heated type. The valves 33 and 34 form parts of a double triode vacuum tube. The valve 35 and a valve 69 are also included in a double triode vacuum tube. The valve 69 is connected for operation as a diode rectifier to supply unidirectional anode voltage to the valves 33, 34, and 35. To that end, the anode of the valve 69 is connected to one terminal of the transformer secondary winding 45 of the transformer 43, and the other terminal of the winding 45 is connected to a grounded conductor 70. The cathode terminal 71' of the valve 69 is connected to the anode of the valve 35 through an anode resistance 71, is connected to the anode of the valve 34 through an anode resistance 72 and an intermediate resistance 73, and is connected to the anode of the valve 33 through an anode resistance 74 and intermediate resistors 73 and 75. The ends of the anode resistors 71, 72, and 74 connected to the resistors 73 and 75 are connected by condensers 76, 77, and 78, respectively to the conductor 70. The resistors 73 and 75 and the condensers 76, 77, and 78 form elements of a filtering system providing single stage filtering of the current supplied to the anode of the valve 35 and double and triple stage filtering of the current respectively supplied to the anodes of the valves 34 and 33. The resistors 71, 72, and 74 constitute load resistors for the valves 35, 34, and 33.

The cathode of the valve 33 is connected to the conductor 70 through a resistor 79 and condenser 80 which are connected in parallel. The resistor 79 and condenser 80 bias the grid of the valve 33 negatively with respect to the cathode of the valve. The cathodes of the valves 34 and 35 are each connected directly to the conductor 70. One end terminal of the transformer secondary winding 68 is connected directly to the conductor 70 and the other end terminal thereof is connected to the control grid and the cathode of the valve 35. The adjustment of nected in parallel with the transformer secondary winding 68. The anode of the valve 33 is connected to the control grid of the valve 34 by a condenser 82. The control grid of the valve 34 is connected to the conductor 70 through a fixed resistor 83. The anode of the valve 34 is connected to one terminal of a condenser 84 which has its other terminal connected to the conductor 70 through a slidewire resistor 85. The control grid of the valve 35 is connected to the resistor 85 through an adjustable contact or wiper 86 which is adjustable along the length of the resistor 85 to vary the portion of the voltage drop across resistor 85 which is applied between the control grid and the cathode of the valve 35. The adjustment of the contact 86 along the resistor 85 adjusts the electrical sensitivity of the self-balancing measuring circuit 5 relatively to the mechanical sensitivity of the motor 8 and of the mechanical connection between the motor and the self-balancing circuit.

The resistor 83 permits a flow of grid current between the grid and cathode of the valve 34 and limits the extent to which that grid may go positive with respect to the cathode. The resistance 85 and slider contact 86 perform a dual function; namely, they limit the extent to which the grid of the valve 35 may go positive with respect to the cathode, and they regulate the magnitude of the signal impressed on the grid of the valve 35 from the anode circuit of the valve 34. The condenser 81 connected in parallel with the transformer secondary winding 68 is provided to load that secondary winding to its ideal impedance at the line voltage frequency. The condenser 82 eliminates the effect of the D. C. component of the anode circuit of the valve 33 on the control grid of the valve 34, and impresses the alternating component of the voltage produced across the resistor 74 on the grid of the valve 34. The condenser 84, connected between the anode of the valve 34 and the grid of the valve 35 prevents the D. C. component of the anode circuit of the valve 34 from passing to the grid of the valve 35, and impresses the alternating component of voltage across the resistor 72 on the grid of the valve 35.

The valves 36 and 37 of the motor drive amplifier 7 are triodes arranged within a double triode vacuum tube, and the valves 38 and 39 are similar triodes within a similar triode vacuum tube. The anodes of the valves 36 and 38 are each connected to the left end terminal of the transformer secondary winding 46 of the transformer 43. The other end terminal of the winding 46 is connected to the anodes of the valves 37 and 39. The alternating anode voltages of the valves 36 and 38 are thus 180° out of phase with the alternating anode voltages of the valves 37 and 39. The cathodes of the valves 36, 37, 38, and 39 are all connected to the conductor 70 through a fixed resistor 87. The control grids of the four motor drive valves are each connected through a condenser 88 to the anode of the third stage amplifier valve 35 and are also connected by a fixed resistor 89 to the conductor 70.

The pair of valves 36 and 37 form a motor drive unit which is a duplicate of the motor drive unit formed by the valves 38 and 39, and which unit is adapted to prevent the failure of the other unit from interfering with the normal operation of the motor 8. The valves 36, 37, 38, and 39 are selected primarily for the power purposes and may well be of the commercially available 7N7 type, and the valves 33, 34, 35, and 69 are selected primarily for amplification purposes and may well be of the commercially available 7F7 type.

The resistor 87 which connects the cathodes of the motor drive valves to ground constitutes a common bias resistance for all of said cathodes. The condenser 88 eliminates the D. C. component of the anode circuit voltage of the valve 35 from the signal applied to the control grids of the motor drive valves, and also serves to impress the alternating component of the voltage produced across the resistor 71 on those grids. The resistor 89 limits the extent to which the grids of the motor drive valves may go positive relative to their associated cathodse.

As shown, the motor 8 is a rotating field motor having a stator 90 with four pole pieces spaced 90° about the rotor axis and having a squirrel cage rotor 91. Two of the opposed pole pieces are surrounded by series connected sections of the motor power winding 50. The other two pole pieces are surrounded by series connected sections of the motor control winding 51. One terminal 92 of the control winding 51 is connected to the midpoint of the transformer secondary winding 46 and the other terminal 93 of the control winding 51 is connected to the conductor 70. A condenser 94 is connected in parallel with the control winding between the terminals 92 and 93. The current in the control winding lags or leads the voltage of the alternating current supply lines L' and L² by approximately 90°, accordingly as the amplified alternating signal is in phase or 180° out of phase with the said supply voltage.

When the voltage and current through the motor control winding 51 lag the voltage and current respectively in the power winding, as they do on a decrease in the unidirectional signal voltage applied to the measuring circuit terminals 9 and 10, the rotor 91 rotates in the clockwise direction. Conversely, when the voltage and current through the motor control winding 51 lead the voltage and current respectively in the power winding 50, as they do on an increase in the voltage of the unidirectional signal voltage, the rotor 91 rotates in the counterclockwise direction. The motor 8 is rotated in one direction or the other as the measuring circuit 5 is unbalanced in one direction or the other, and the speed of operation of the motor in either direction is dependent directly upon the amount of unbalance between the unidirectional signal voltage and the voltage drop across resistor 19.

The foregoing explanation describes the essential features of construction and operation of the voltage amplifier 6 and motor drive amplifier 7 in selectively energizing the motor 8 for rotation in one direction or the other accordingly as an unbalanced unidirectional current flows in one direction or the other through the measuring circuit conductors 25 and 29.

In operation, assuming that the unidirectional signal voltage applied to the measuring circuit terminals 9 and 10 has increased, a unidirectional current will flow through the conductors 25 and 29 from the conductor 25 through the conductors 25 and 29 from the conductor 25 alternately through the transformer primary winding sections 58 and 59 as the contact 65 of the vibrator 31 alternately engages the relatively stationary contacts 62 and 63, to the conductor 29. The alternating voltage then produced in the transformer secondary winding 68 and amplified by the voltage amplifier 6 is of the proper phase to cause the motor drive amplifier 7 to energize the reversible motor 8 for rotation in the counterclockwise direction. Such operation of the motor 8 operates through the cable drive arrangement to effect a clockwise adjustment of the drum 56 and movement of the wiper 13 along the slidewire resistor 12 to impress a greater portion of the voltage drop across the slidewire resistor 12 between the conductors 22 and 23. In consequence, a correspondingly larger current flow is established in the transmission circuit conductors 1 and 2 and through the fixed resistor 19. The voltage drop produced across the resistor 19 is then immediately increased to a value equal to the new value of the unidirectional signal voltage applied to the measuring circuit input terminals 9 and 10. With the proper adjustment of the apparatus, including the sensitivity adjusting slidewire 85 and contact 86, it is possible for the reversible motor 8 to quickly effect such a balance restoring adjustment of the slidewire resistor 12 substantially instantaneously with the occurrence of an unbalance current flow through the conductors 25 and 29 in the measuring circuit 5 due to change in the unidirectional signal voltage being measured and applied to the terminals 9 and 10. It will be apparent that with this arrangement the apparatus may be made very sensitive and slight changes in the unidirectional signal voltage will immediately be indicated by the distantly located meters 3 and 4.

For the purpose of obtaining this desirable sensitive and immediate response to a change in the unidirectional signal voltage while maintaining any tendency to hunting at a minimum, the inherent damping and anti-hunting characteristics of the motor 8 are employed and in addition the resistor 30 and a condenser 95 connected in the measuring circuit 5 are employed to introduce an anti-hunting action in each balancing operation.

A number of factors contribute to the desirable inherent damping and anti-hunting characteristic of the motor 8. Thus, when the measuring circuit 5 is balanced and there is no current flow through the conductors 25 and 29, a relatively large direct current flows through the motor control winding 51. This direct current flow through the control winding 51 acts as a brake to prevent rotation of the rotor 91. When the measuring circuit 5 is balanced, the rotation of the rotor 91 causes the conductor bars to cut flux produced by the direct current flow through the motor control winding 51 and thus produces a relatively heavy current in the rotor conductor bars which in turn quickly expends the rotative force of the rotor. Thus, the development of a relatively heavy current in the rotor conductor bars provides an effective braking action. It is also to be noted that when the current flowing through the motor control winding 51 includes a 120 cycle A. C. component, that component has a high peak and a low peak in each half cycle, as explained in the aforementioned Wills patent, and in effect, the high peak and low peak of each half cycle cancel each other and therefore do not subject the rotor 91 to any turning effort. The 120 cycle alternating current flowing in the motor control winding also acts the same as the direct current component to provide braking. As the measuring circuit 5 is restored to balance following an unbalance thereof, the braking action on the motor is increased so that rotation of the motor is rapidly stopped when the apparatus is rebalanced without the occurrence of overshooting or hunting.

The resistor 30 and condenser 95 connected in the measuring circuit 5 are employed for the purpose of introducing an additional anti-hunting or braking action to permit very rapid operation of the motor 8 in accomplishing the circuit rebalancing functions. In accomplishing this anti-hunting action, the resistor 30 and condenser 95 collectively operate, as described in Reissue Patent 23,121 of Thomas R Harrison and Walter P. Wills, reissued on June 14, 1949, to so delay the application of the full change in the unidirectional signal voltage, upon a change in the latter, as to introduce an effect compensating for the inertia for the motor 8 and the cable drive connection whereby the tendency to hunting is eliminated. By providing such delaying means, the full extent to which the measuring circuit 5 will be unbalanced on a given change in the unidirectional signal voltage is not immediately applied to produce operation of the reversible motor 8, but is applied thereto at a rate depending upon the charging characteristic of the condenser 95, which charging rate is so selected as to correspond to the inertia of the reversible motor 8 and the cable drive mechanism, thereby compensating for such inertia and preventing hunting of the apparatus. Consequently, the operation of the motor 8 in rebalancing the measuring circuit 5 may be exceedingly rapid and the motor will decelerate as the full unbalance of the measuring circuit 5 is reduced and will gradually ease into rebalancing position without exceeding it.

The remote metering apparatus illustrated and described tends to be adversely affected to some extent by stray currents which may be induced into the measuring circuit 5 or in the transmission circuit conductors 1 and 2. For the purpose of eliminating or reducing the effects of these stray currents various steps have been taken. Thus resistors 21 and 24 are connected in circuit with the transmission conductors 1 and 2 respectively, and those transmission conductors are connected by an individually associated condenser 96 and 97 to ground potential. As shown, the condenser 96 connects the point of connection of conductor 20 and resistor 21 to ground potential and the condenser 97 connects the junction of conductor 23 and resistor 24 to ground potential. Those two junctions are also connected to each other by a condenser 98. These condensers 96, 97, and 98 together with resistors 21 and 24 act as a filter for reducing to a minimum alternating stray currents which tend to be introduced into the transmission circuit and into the measuring circuit 5. Also, the resistor 30 and condenser 95 which serve the damping purpose hereinbefore described, act as a filter for reducing to a minimum alternating stray currents which may tend to be introduced into the measuring circuit 5, at the input terminals 9 and 10. Further, any 60 cycle stray current which may be introduced into the measuring circuit 5 and which is not entirely eliminated by the resistor 30 and condenser 95 is transformed by the vibrator 31 and transformer 32 into 120 cycle alternating current. This 120 cycle alternating current has no effect upon the operation of the reversible motor 8, as is explained in the aforementioned Wills patent.

It is important to note that the resistors 21 and 24 in addition to serving the filtering purpose above mentioned, also render the operation of the remote metering apparatus described immune to changes in the impedance of the two-conductor transmission circuit. To this end, the resistors 21 and 24 may each desirably have a value of 500 ohms. The condensers 96, 97, and 98 associated with the resistors 21 and 24 for the filtering purpose may each desirably have a value of 1 microfarad. Values for other of the measuring circuit components which have been employed in a practically operative embodiment of the invention are as follows:

| Element | | Value |
|---|---|---|
| 12 | ohms | 200 |
| 19 | do | 10 |
| 30 | do | 150 |
| 95 | mfd | 500 |

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent, is as follows:

1. Apparatus for exhibiting at a distance the magnitude and changes in magnitude of a variable unidirectional voltage comprising a transmitting device, a unidirectional current responsive and remotely located receiving device, and a two-wire transmission circuit connecting said transmitting and receiving devices, said transmitting device comprising a normally balanced measuring network responsive to variations in said unidirectional voltage and adapted to be unbalanced in one direction or the other depending upon the direction of change in said unidirectional voltage, said measuring network including a pair of input terminals to which said unidirectional voltage is adapted to be applied and a resistor of fixed magnitude, a pair of output terminals connected to said two-wire transmission circuit, mechanically adjustable unidirectional voltage supply means, a circuit connection including in series said fixed resistor, one wire of said transmission circuit, said unidirectional current responsive receiving device, the other wire of said transmission circuit, and said adjustable voltage supply means to establish a unidirectional current flow through said fixed resistor, said transmission circuit and said receiving device, a reversible rebalancing motor mechanically connected to said adjustable voltage supply means for adjustment of the latter in accordance with the operation of said motor, means connecting said pair of input terminals to said fixed resistor to oppose said variable unidirectional voltage to the voltage drop established across said fixed resistor by said unidirectional current flow therethrough and to derive a resultant unidirectional voltage which is the resultant of said opposed variable voltage and voltage drop, means responsive to said resultant voltage including a conversion device having an input portion connected to receive said resultant voltage, having an output portion, and operative to convert said resultant voltage into an alternating current voltage in said output portion of a magnitude and phase which are respectively dependent upon the magnitude and polarity of said resultant voltage, and motor control means connected to said output portion and to said motor and responsive to said alternating current voltage to energize said motor selectively for operation in accordance with the magnitude and phase of the last mentioned voltage and hence in the direction and to the extent required to reduce said resultant voltage substantially to zero and to balance said measuring network, said responsive and motor control means being operative to maintain said motor stationary and said measuring network balanced notwithstanding the application of zero resultant voltage to said input portion.

2. Apparatus as specified in claim 1, in which said reversible rebalancing motor includes a control winding, and in which said responsive means is operative to derive an alternating current motor drive signal having a predetermined frequency and which is of one phase or of the opposite phase depending upon the polarity of said resultant voltage, and means included in said motor control means and actuated by said motor drive signal to supply current to said winding of said frequency and of a phase depending upon the phase of said signal for operation of said motor.

3. Apparatus as specified in claim 1, in which said circuit connection includes a filter to minimize the effects of extraneous electrical and magnetic fields to which said transmitting and receiving devices and said transmission circuit may be subjected, and in which said filter includes a separate fixed resistor connected in circuit with each of said transmission circuit wires at said output terminals, a separate condenser connecting to ground potential each of the ends of said last mentioned fixed resistors remote from said transmission circuit, and a condenser connected between the said ends of said resistors.

4. Apparatus as specified in claim 1, including anti-hunting means connected in said normally balanced measuring network to minimize the tendency of said motor to overrun and hunt when effecting its rebalancing operations, and in which said anti-hunting means includes a fixed resistor and a fixed condenser, a connection from one terminal of said condenser to one of said input terminals and a connection from the other terminal of said condenser to said other input terminal including said last mentioned fixed resistor whereby the variable unidirectional voltage applied to said input terminals is applied through said last mentioned fixed resistor to said condenser, and in which the responsive means in controlling the motor control means responds to the resultant of the voltage on said condenser and the voltage drop produced across said first mentioned fixed resistor.

5. A transmitting device for use in exhibiting at a distance the magnitude and changes in magnitude of a variable unidirectional voltage comprising a normally balanced measuring network responsive to variations in said unidirectional voltage and adapted to be unbalanced in one direction or the other depending upon the direction of change in said unidirectional voltage, said measuring network including a pair of input terminals to which said unidirectional voltage is adapted to be applied and a resistor of fixed magnitude, a pair of output terminals adapted for connection to a two-wire transmission circuit, mechanically adjustable unidirectional voltage supply means, a circuit connection including in series said fixed resistor, said pair of output terminals, and said adjustable voltage supply means to establish a unidirectional current flow through said fixed resistor and through said output terminals to the transmission circuit when connected thereto, a reversible rebalancing motor mechanically connected to said adjustable voltage supply means for adjustment of the latter in accordance with the operation of said motor, means connecting said pair of input terminals to said fixed resistor to oppose said variable unidirectional voltage to the voltage drop established across said fixed resistor by said unidirectional current flow therethrough and to derive a resultant unidirectional voltage which is the resultant of said opposed variable voltage and voltage drop, means responsive to said resultant voltage including a conversion device having an input portion connected to receive said resultant voltage, having an output portion, and operative to convert said resultant voltage into an alternating current voltage in said output portion of a magnitude and phase which are respectively dependent upon the magnitude and polarity of said resultant voltage, and motor control means connected to said output portion and to said motor and responsive to said alternating current voltage to energize said motor selectively for operation in accordance with the magnitude and phase of the last mentioned voltage and hence in the direction and to the extent required to reduce said resultant voltage substantially to zero and to balance said measuring network, said responsive and motor control means being operative to maintain said motor stationary and said measuring network balanced notwithstanding the application of zero resultant voltage to said input portion.

6. A transmitting device as specified in claim 5, in which said reversible rebalancing motor includes a control winding, and in which said responsive means is operative to derive an alternating current motor drive signal having a predetermined frequency and which is of one phase or of the opposite phase depending upon the polarity of said resultant voltage, and means included in said motor control means and actuated by said motor drive signal to supply current to said winding of said frequency and of a phase depending upon the phase of said signal for operation of said motor.

7. A transmitting device as specified in claim 5, in which said circuit connection includes a filter to minimize the effects of extraneous electrical and magnetic fields to which said transmitting device and said transmission circuit may be subjected, and in which said filter includes a separate fixed resistor connected in circuit with each of said output terminals, a separate condenser connecting to ground potential each of the ends of said last mentioned fixed resistors remote from said output terminals, and a condenser connected between said ends of said fixed resistors.

8. A transmitting device as specified in claim 5, in which said adjustable voltage supply means includes a slidewire resistor, a contact in engagement with and arranged to be adjusted by said motor along the length of said resistor, a connection from one end of said slidewire resistor to one end terminal of said fixed resistor, a connection from said contact to one of said output terminals, and means operable to produce a unidirectional voltage across said slidewire resistor including a transformer having a primary winding and a secondary winding, said primary winding having a pair of terminals adapted for connection to a source of alternating voltage, a rectifier bridge having a pair of input terminals connected for energization to the secondary winding of said transformer and having a pair of output terminals, and means applying the unidirectional voltage produced between said rectifier bridge output terminals across said slidewire resistor.

9. A transmitting device as specified in claim 5, including anti-hunting means connected in said normally balanced measuring network to minimize the tendency of said motor to overrun and hunt when effecting its rebalancing operations, and in which said anti-hunting means includes a fixed resistor and a fixed condenser, a connection from one terminal of said condenser to one of said input terminals and a connection from the other terminal of said condenser to said other input terminal including said last mentioned fixed resistor whereby the variable unidirectional voltage applied to said input terminals is applied through said last mentioned fixed resistor to said condenser, and in which the responsive means in deriving an alternating motor drive signal responds to the resultant of the voltage on said condenser and the voltage drop produced across said first mentioned fixed resistor.

References Cited in the file of this patent

UNITED STATES PATENTS

| Number | Name | Date |
|---|---|---|
| 1,960,350 | Shackleton et al. | May 29, 1934 |
| 1,995,594 | Wunsch | Mar. 26, 1935 |
| 2,011,315 | Gilbert | Aug. 13, 1935 |
| 2,106,825 | Bernarde | Feb. 1, 1938 |
| 2,452,023 | Wild | Oct. 19, 1948 |
| 2,472,167 | Matson, Jr. et al. | June 7, 1949 |

FOREIGN PATENTS

| Number | Country | Date |
|---|---|---|
| 378,366 | Great Britain | Aug. 11, 1932 |